(12) United States Patent
Mori

(10) Patent No.: US 7,167,268 B2
(45) Date of Patent: Jan. 23, 2007

(54) IMAGE PROCESSING APPARATUS AND IMAGE PROCESSING METHOD

(75) Inventor: Shinichi Mori, Tagata-gun (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 815 days.

(21) Appl. No.: 10/283,141

(22) Filed: Oct. 30, 2002

(65) Prior Publication Data

US 2004/0160638 A1 Aug. 19, 2004

(51) Int. Cl.
*G06F 12/02* (2006.01)

(52) U.S. Cl. .................... 358/1.16; 358/1.15; 358/524; 358/402; 358/404

(58) Field of Classification Search ............... 358/1.16, 358/1.15, 524, 402, 404
See application file for complete search history.

(56) References Cited

U.S. PATENT DOCUMENTS 5,898,824 A * 4/1999 Kato et al. ................. 358/1.16

2003/0226039 A1 * 12/2003 Maki ........................... 713/201
2005/0162695 A1 * 7/2005 Shiraiwa ..................... 358/1.16

FOREIGN PATENT DOCUMENTS

| JP | 9-135323 | 5/1997 |
|----|----------|--------|
| JP | 2000-32204 | 1/2000 |

* cited by examiner

*Primary Examiner*—Mark Zimmerman
*Assistant Examiner*—Jacob P. Rohwer
(74) *Attorney, Agent, or Firm*—Foley & Lardner LLP

(57) ABSTRACT

An image processing apparatus according to the present invention includes a receiving section which receives image data over the Internet and temporarily storing it, a printing section which prints the temporarily stored image data, a category defining section which defines categories of volume of image data by means of threshold values, an output destination specifying section which specifies the destination of output of the temporarily stored image data from a plurality of output sections, including the printing section, by referring to the categories defined by the category defining section, a judging section which determines the category of the image data as defined by the category defining section, and a processing section which processes the image data in accordance with the output section for the category as determined by the judging section.

19 Claims, 3 Drawing Sheets

| Category defining section | Output destination specifying section |
|---|---|
| $I < 0.05M$ | Printing section |
| $0.05M \leq I < 0.2M$ | Operation/display section |
| $0.2M \leq I$ | PC |

IMAGE PROCESSING APPARATUS AND IMAGE PROCESSING METHOD

BACKGROUND OF THE INVENTION

1. Field of the Invention

This invention relates to an image processing apparatus and an image processing method for processing image data received over the Internet.

2. Description of the Related Art

An image processing apparatus adapted to utilize the Internet, such as an Internet fax apparatus, is known. The Internet fax apparatus is designed to reduce communication costs by partly utilizing the Internet in place of telephone lines.

Such an Internet fax apparatus prints image data it receives, such as document data, without discrimination. Therefore, a large number of sheets of printing paper are consumed when a large volume of data is received at a time.

An Internet fax apparatus has the advantage of saving time and cost to a large extent because it transmits a large volume of documents as image data by utilizing the Internet only to a nearby connection point and hence it only has to bear the cost for the transmission to that point. Transmission of such a large volume of data by fax and a telephone line entails considerable time and cost.

On the other hand, the receiving party faces an increased number of occasions of receiving a large volume of document image data at a time. Each time a large volume of image data is transmitted, the reception memory of the receiving Internet fax apparatus is occupied by the data. Then, since the apparatus prints all the image data it has received, it delivers a large volume of printed matter at a time. Thus, a large volume of recording paper is consumed at a time and the image data that is printed may include unnecessary documents.

BRIEF SUMMARY OF THE INVENTION

The object of the present invention is to provide an image processing apparatus and an image processing method that can eliminate wasteful consumption of recording paper by switching the output section thereof for outputting the image data such as a document received by Internet fax depending on the volume of the image data.

In an aspect of the invention, the above object is achieved by providing an image processing apparatus comprising: a receiving section which receives image data over the Internet and temporarily storing it; a printing section which prints the temporarily stored image data; a category defining section which defines categories of volume of image data by means of threshold values; an output destination specifying section which specifies the destination of output of the temporarily stored image data from a plurality of output sections, including the printing section, by referring to the categories defined by the category defining section; a judging section which determines the category of the image data as defined by the category defining section; and a processing section which processes the image data in accordance with the output section for the category as determined by the judging section.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Now, an embodiment of image processing apparatus according to the invention applied to a digital multifunction machine will be described by referring to the accompanying drawings.

Figure 1:
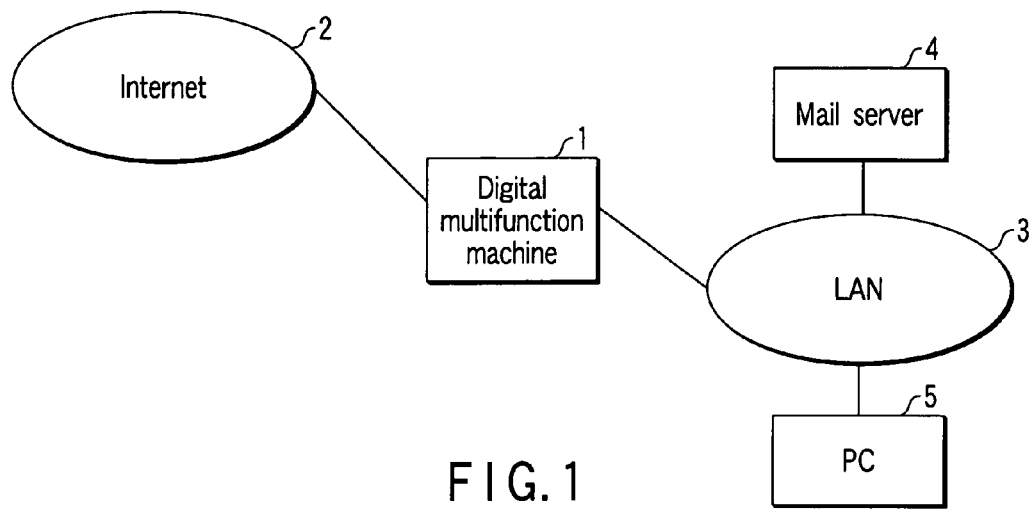
FIG. 1 is a schematic block diagram of the configuration of a network to which an embodiment of the invention.

FIG. 1 is a schematic block diagram of the configuration of a network to which a digital multifunction machine is connected. The digital multifunction machine 1 is connected to the Internet 2 and a local area network (LAN) 3. A mail server 4 and a personal computer (PC) 5 is connected to the LAN 3. The mail server 4 controls the data that are transmitted/received between the digital multifunction machine 1 and the PC 5 that are connected to the LAN 3.

Figure 2:
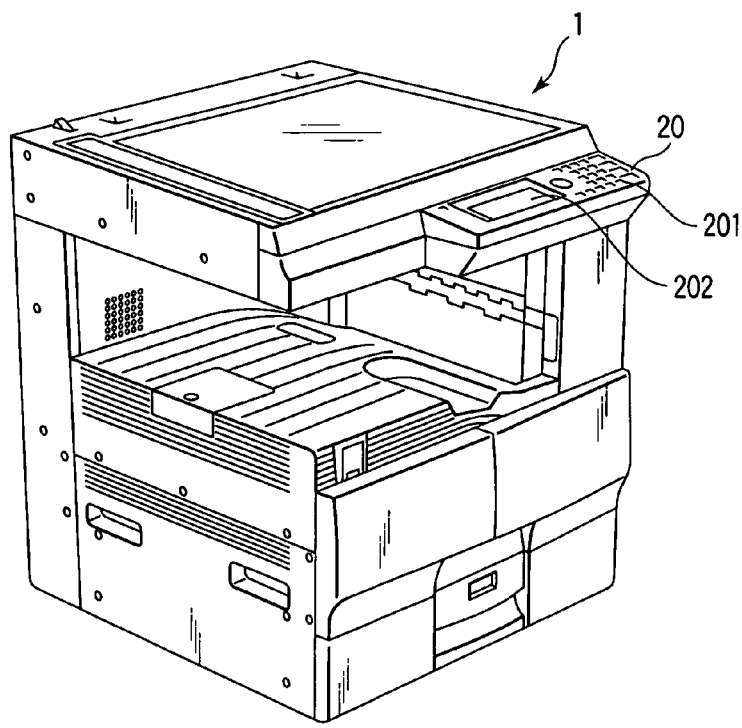
FIG. 2 is a schematic perspective view of a digital multifunction machine.
Figures 3, 4:
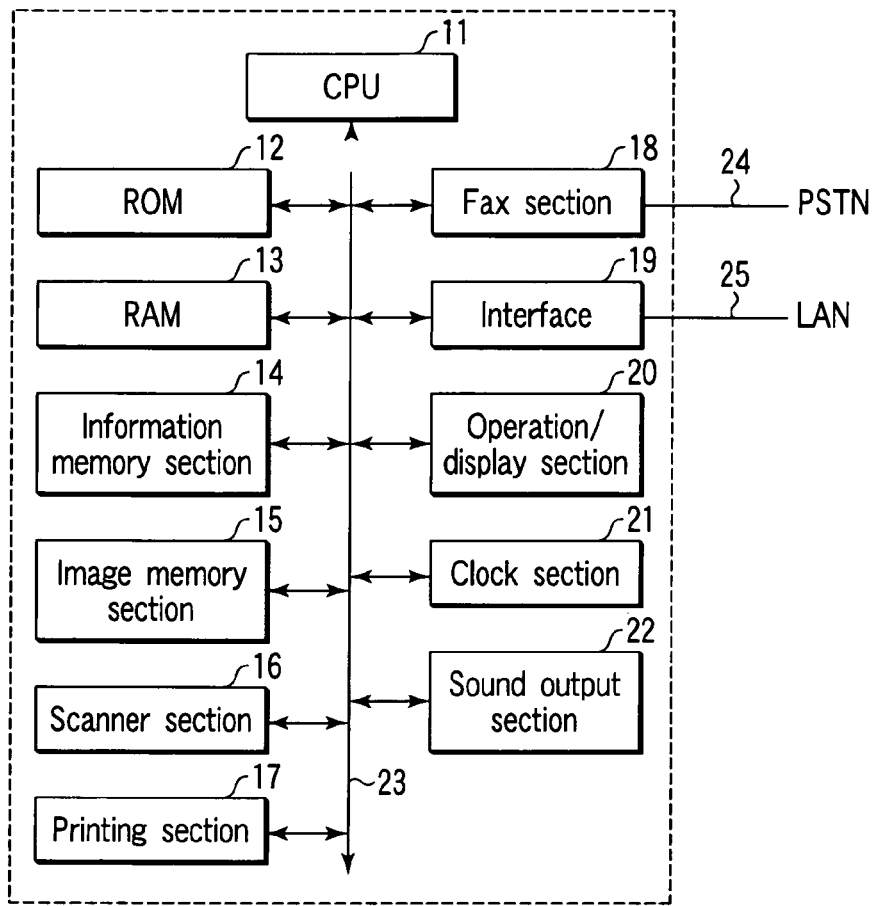
FIG. 3 is a schematic block diagram of a digital multifunction machine, illustrating the configuration of a principal part thereof.
FIG. 4 is an illustration of the defined data to be stored.

FIG. 2 is a schematic perspective view of the digital multifunction machine 1 and FIG. 3 is a schematic block diagram of a digital multifunction machine 1, illustrating the configuration of a principal part thereof.

The digital multifunction machine 1 comprises as principal components thereof a CPU 11, a ROM 12, a RAM 13, an information memory section 14, an image memory section 15, a scanner section 16, a printing section 17, a fax section 18, an interface 19, an operation/display section 20, a clock section 21 and a sound output section 22.

The CPU 11, the ROM 12, the RAM 13, the information memory section 14, the image memory section 15, the scanner section 16, the printing section 17, the fax section 18, the interface 19, the operation/display section 20, the clock section 21 and the sound output section 22 are connected to each other by way of a bus line 23.

The CPU 11 performs various processing operations for controlling the components of the digital multifunction machine 1 according to the control program stored in the ROM 12 in order to make the digital multifunction machine operate properly.

The ROM 12 stores the control program to be used by the CPU 11.

The RAM 13 operates as work area for storing various pieces of information necessary for the CPU 11 to carry out various processing operations and also as reception buffer for temporarily storing the image data in the tiff format of Internet fax received over the Internet 2.

The information memory section 14 is typically realized by using a nonvolatile flash memory and adapted to store various defined pieces of information. The storage area of the information memory section 14 is partly used for storing the category relating to the volume of the image data received over the Internet 2 as defined by a category defining section, using a plurality of threshold values. The storage area of the information memory section 14 is also partly used for storing output sections, one of which is to be specified by the output destination specifying section by referring to the categories defined by the category defining section.

Categories are defined by the category defining section in a manner as described below. If the total memory capacity of the reception buffer for receiving image data is M, the category defining section defines, for example, 0.05 M and 0.2 M as a plurality of threshold values. Thus, if the volume of the received image data is I, three categories of I<0.05 M, $0.05 M \leq I < 0.2 M$ and $0.2 M \leq I$ will be defined as shown in FIG. 4. While threshold values are defined depending on the memory capacity of the reception buffer in the above description, they may alternatively numerically defined in advance.

Output sections to be specified by the output destination specifying section by referring to the categories are defined typically in a manner as shown in FIG. 4. The printing section 17 is specified as output section of image data when I<0.05 M and the operation/display section 20 is specified as output section of image data when $0.05 M \leq I < 0.2 M$, whereas the PC 5 is specified as output section when $0.2 M \leq I$.

Thus, the image data received over Internet fax is automatically transferred to the printing section 17 and printed there when the volume of the image data is small but it is transferred to the operation/display section 20 and the contents of the image data are displayed there when the volume of the image data is not very large, whereas it is automatically transferred to the PC 5 when the volume of the image data is large.

Note that, if the image data temporarily stored in the reception buffer is transferred to the computer, or the PC 5, the reception record (history) and the data on the destination of transfer of the image data are stored typically in the RAM 13. Therefore, the user can see the reception record and the destination of transfer anytime thereafter.

The image memory section 15 is typically realized by using a large capacity DRAM or a hard disk device. The image memory section 15 is provided to store image data.

The scanner section 16 reads the image of an original according to a predetermined sequence of operation only when the original is placed on the original table and subsequently the cover (not shown) of the original table is closed.

The printing section 17 prints the image of the image data on a sheet of recording paper.

The fax section 18 operates for facsimile communications and other communications, utilizing a public switched telephone network (PSTN) line 24 and other lines over the Internet 2.

The interface 19 is connected to the LAN 3 by way of a LAN line 25. The interface 19 operates as receiving section for receiving image data by means of Internet fax.

The operation/display section 20 includes a key input section 201 for receiving inputs of various commands to the CPU 11 from the user and a liquid crystal display (LCD) 202 that is a display section for displaying various pieces of information to be notified to the user under the control of the CPU 11. Inputs can be made to the key input section 201 by means of alphanumeric data.

The user of the digital multifunction machine 1 can alter any of the definitions of the category defining section and the output destination specified by the output destination specifying section as described above by referring to FIG. 4 by operating the key input section 201. Additionally, the user can select either effectuation or cancellation of any of the definitions of the category defining section and the output destination specified by the output destination specifying section. For example, if the user cancels the switch of the output destination of the received image data, the received image data is always printed regardless of the volume of the image data. In other words, the digital multifunction machine 1 can be made to adapt itself to the operation environment thereof by the user because the user can select either effectuation or cancellation of the output destination.

The clock section 21 constantly operates for timing and outputs time information indicating the current time and day.

The sound output section 22 outputs a predetermined sound when a predefined situation occurs.

In the digital multifunction machine 1 having the above described configuration, the ROM 12 stores the control programs to be used by the CPU 11. The control programs includes the general control program of the digital multifunction machine 1 and also a control program for selecting the category to which the volume of the image data received by Internet fax belongs and a control program for processing the image data in accordance with the output section specified according to the selected category.

Figure 5:
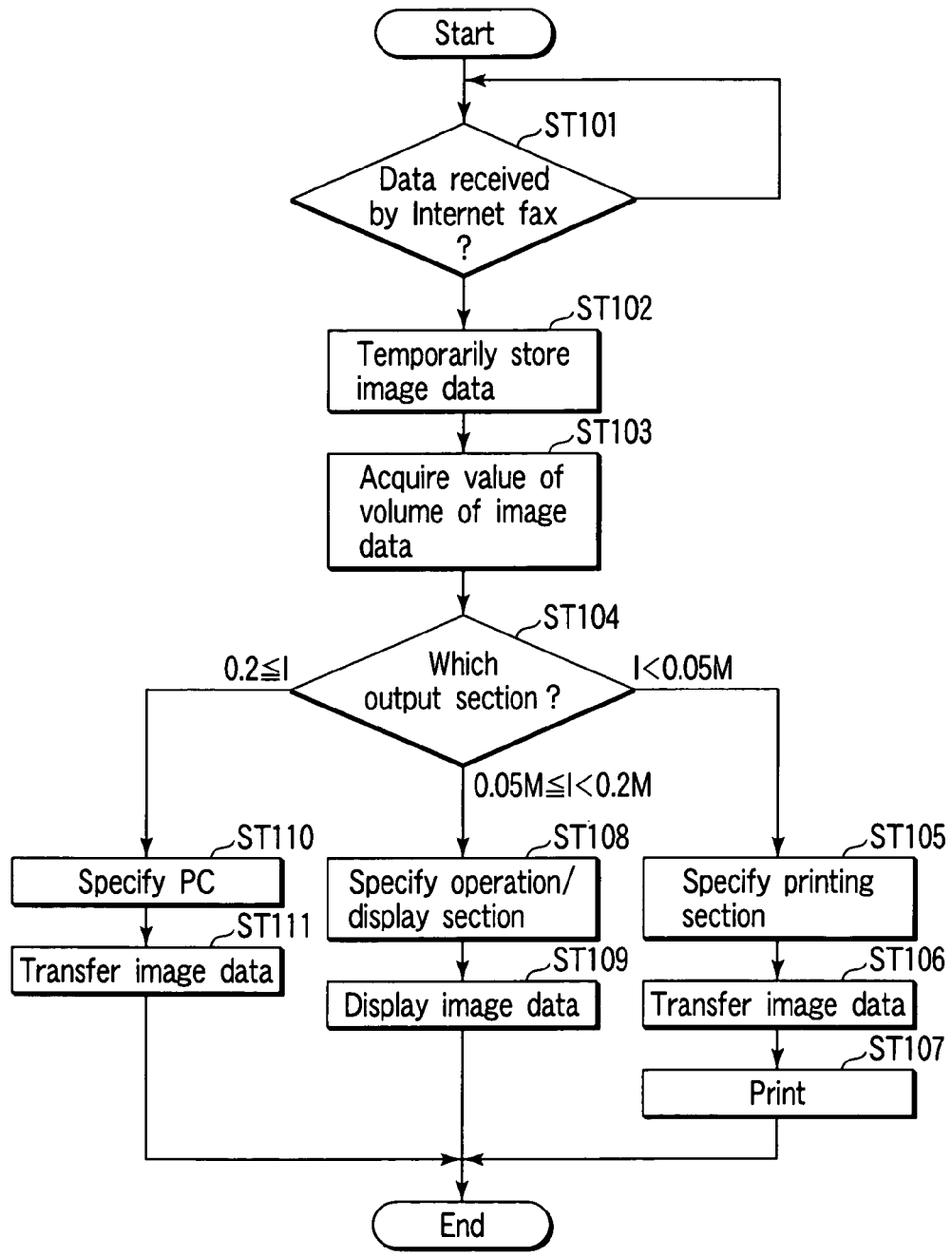
FIG. 5 is a flowchart of the processing operation that is carried out when image information is received over the Internet.

FIG. 5 is a flowchart of the processing operation that is carried out by the CPU 11 when image data is received by Internet fax from the Internet 2.

Firstly in Step ST101, the CPU 11 determines if image data is received by Internet fax or not. If it determines that image data is received by Internet fax, it proceeds to Step ST102, where it temporarily stores the image data transmitted by Internet fax in the reception buffer of the RAM 13. Subsequently in Step ST103, the CPU 11 obtains information on the volume of the image data stored in the reception buffer.

Then in Step ST104, the CPU 11 determines the category defined by threshold values to which the volume of the received image data belongs (judging section).

If it is determined in Step ST104 that the volume I of the image data belongs to the category of I<0.05 M (M=the total memory capacity of the reception buffer), the CPU 11 specifies the printing section 17 as output section in Step ST105. Then, in Step ST106, the CPU 11 performs the processing operation for outputting the image data to the printing section 17. In Step ST107, the CPU 11 controls the printing section 17 so as to make it print the image data and terminates the processing operation.

If, on the other hand, it is determined in Step ST104 that the volume I of the image data belongs to the category of $0.05 M \leq I < 0.2 M$, the CPU 11 specifies the operation/display section 10 as output section in Step ST108. Then, in Step ST109, the CPU 11 causes the LCD 202 of the operation/display section 20 to display the received image data and terminates the processing operation.

Finally, if it is determined in Step ST104 that the volume I of the image data belongs to the category of $0.2 \leq M$, the CPU 11 specifies the PC 5 connected to the LAN 3 as output section in Step ST110. Then, in Step ST111, the CPU transfers the received image data to the PC 5 by way of the LAN 3 and terminates the processing operation.

Note that the operations in Step ST106, Step ST109 and Step ST111 are those of processing the image data for the corresponding output sections.

Therefore, if the printing section 17 is specified as output section because the volume of the image data is small, the digital multifunction machine 1 automatically drives the printing section 17 to print the image data after receiving it by Internet fax.

If, on the other hand, the operation/display section 20 is specified as output section, the digital multifunction machine 1 causes the LCD 202 of the operation/display section to display the image data. Then, if operator feels it necessary to obtain the image data in a printed form by seeing it on the LCD 202, he or she operates the key input section 201 so as to have the image data printed. It may additionally be so arranged that, when the image data is displayed on the LCD 202, the sound output section 22 outputs a sound to notify the operator of the fact that the image data is displayed on the LCD 202.

Finally, if the PC 5 is specified as output section and hence the volume of the image data is large, the image data is automatically transferred to the PC 5. Therefore, the image data stored in the reception buffer can be erased immediately after the end of the reception to make the digital multifunction machine ready for receiving the next image data. It may additionally be so arranged that the operator sees the contents of the image data on the PC 5 and, whenever he or she feels necessary, have the image data printed. Since image data received by Internet fax is data in the tiff format, the received image data can be directly transferred to the PC 5 without conversion. In other words, the operator can handle the transferred image data like electronic mail so that the transferred image data can be controlled easily and efficiently. If the operator edits the transferred image data in the tiff format and stores the edited image data in that format, the edited image data can also be transmitted by Internet fax.

This embodiment of digital multifunction machine 1 can switch the output section specified as output destination of the image data received by Internet fax depending on the volume of the image data. In other words, the received image data is not necessarily printed but selectively printed, displayed or transferred in a switched manner in accordance with the specified output section. Thus, since the digital multifunction machine 1 does not automatically print all the received image data, it can eliminate wasteful consumption of recording paper.

While the printing section 17, the operation/display section 20 and the PC 5 are used as three output sections in the above described embodiment, the present invention is by no means limited thereto. Alternatively, two operational sections of a digital multifunction machine according to the invention may be used as output sections. Still alternatively, four or more than four operational sections of a digital multifunction machine according to the invention may be used as output sections. Additionally, the image memory section 15 may be specified as output section to which the image data received by Internet fax is transferred.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image processing apparatus comprising:
   a receiving section which receives image data over the Internet and temporarily stores the image data;
   a printing section which prints the temporarily stored image data;
   a category defining section which defines categories of volume of image data by means of threshold values, the threshold values being defined depending on a total capacity of the receiving section;
   an output destination specifying section which specifies the destination of output of the temporarily stored image data from a plurality of output sections including the printing section by referring to the categories defined by the category defining section;
   a judging section which determines the category of the received image data as defined by the category defining section; and
   a processing section which processes the image data in accordance with the output section for the category as determined by the judging section,
   wherein the category defining section defines at least a first category which corresponds to a first threshold value, and a second category which corresponds to a second threshold value greater than the first threshold value,
   wherein, when the volume of image data is less than the first threshold, the processing section processes the image data by printing the image data,
   wherein, when the volume of image data is greater than the first threshold but less than the second threshold, the processing section processes the image data by displaying the image data on a display, and
   wherein, when the volume of image data is greater than the second threshold, the processing section processes the image data by storing the image data onto a computer memory.

2. An image processing apparatus according to claim 1, wherein one of the output sections is a computer connected to the apparatus by way of a network and the operation of processing the image data in accordance with the output section is an operation of transferring the image data to the computer.

3. An image processing apparatus according to claim 1, wherein one of the output sections is a display section adapted to display the contents of the received image data and the operation of processing the image data in accordance with the output section is an operation of displaying the image data on the display section.

4. An image processing apparatus according to claim 1, wherein one of the output sections is a memory section arranged to store the received image data and the operation of processing the image data in accordance with the output section is an operation of transferring the image data to the memory section.

5. An image processing apparatus according to claim 1, wherein three or more than three output sections are provided.

6. An image processing apparatus according to claim 1, wherein the received image data is in a tiff format.

7. An image processing apparatus according to claim 1, further comprising an input section which selects either effectuation or cancellation of any of the defined categories of the category defining section and the output destination specified by the output destination specifying section.

8. An image processing apparatus according to claim 2, further comprising a memory section which stores the data on a destination of transfer as a reception record.

9. An image processing apparatus comprising:
a receiving section which receives image data over the Internet and temporarily stores the image data;
a printing section which prints the temporarily stored image data;
a display section which displays the temporarily stored image data;
a computer connected to a network which transfers the temporarily stored image data;
a category defining section which defines three categories of volume of image data by means of threshold values, the threshold values being defined depending on a total capacity of the receiving section;
an output destination specifying section which specifies the destination of output of the temporarily stored image data as selected from the printing section, the display section and the computer by referring to the three categories defined by the category defining section;
a judging section which determines the category of the received image data as defined by the category defining section; and
a processing section which processes the image data in accordance with the output section for the category as determined by the judging section,
wherein the category defining section defines at least a first category which corresponds to a first threshold value, and a second category which corresponds to a second threshold value greater than the first threshold value,
wherein, when the volume of image data is less than the first threshold, the processing section processes the image data by printing the image data,
wherein, when the volume of image data is greater than the first threshold but less than the second threshold, the processing section processes the image data by displaying the image data on a display, and
wherein, when the volume of image data is greater than the second threshold, the processing section processes the image data by storing the image data onto a computer memory.

10. An image processing apparatus according to claim 9, wherein the received image data is in a tiff format.

11. An image processing apparatus according to claim 9, further comprising an input section which selects either effectuation or cancellation of any of the defined categories of the category defining section and the output destination specified by the output destination specifying section.

12. An image processing method comprising:
receiving image data over the Internet;
temporarily storing the received image data;
acquiring the value of the volume of the image data;
determining the category of the acquired value of the volume out of the categories of volume of image data defined by means of threshold values, the threshold values being defined depending on a total capacity of a buffer used to receive the image data in the receiving step;
specifying the destination of output of the temporarily stored image data from a plurality of output sections including a printing section adapted to print the temporarily stored image data by referring to the categories; and
processing the image data in accordance with the specified output section,
wherein the determining step defines at least a first category which corresponds to a first threshold value, and a second category which corresponds to a second threshold value greater than the first threshold value,
wherein, when the volume of image data is less than the first threshold, the processing step processes the image data by printing the image data,
wherein, when the volume of image data is greater than the first threshold but less than the second threshold, the processing step processes the image data by displaying the image data on a display, and
wherein, when the volume of image data is greater than the second threshold, the processing step processes the image data by storing the image data onto a computer memory.

13. An image processing method according to claim 12, wherein one of the output sections is a computer connected to the apparatus by way of a network and the operation of processing the image data in accordance with the output section is an operation of transferring the image data to the computer.

14. An image processing method according to claim 12, wherein one of the output sections is a display section adapted to display the contents of the received image data and the operation of processing the image data in accordance with the apparatus is an operation of displaying the image data on the display section.

15. An image processing method according to claim 12, wherein one of the output sections is a memory section arranged to store the received image data and the operation of processing the image data in accordance with the output section is an operation of transferring the image data to the memory section.

16. An image processing method according to claim 12, wherein three or more than three output sections are provided.

17. An image processing method according to claim 12, wherein the received image data is in a tiff format.

18. An image processing method according to claim 12, further comprising: selecting, via an input section, either effectuation or cancellation of any of the defined categories obtained by the determining step and the output destination specified by the specifying step.

19. An image processing method comprising:
receiving image data over the Internet;
temporarily storing the received image data;
acquiring the value of the volume of the image data;
determining the category of the acquired value of the volume out of the three categories of volume of image data defined by means of threshold values, the threshold values being defined depending on a total capacity of a buffer used to receive the image data in the receiving step;
specifying the destination of output of the temporarily stored image data from the output sections including a printing section adapted to print the image data, a memory section for storing the image data and a computer connected to a network for transferring the image data by referring to the categories;
printing the temporarily stored image data upon specification of the printing section as output section;
displaying the temporarily stored image data upon specification of a display section as output section; and transferring the temporarily stored image data to the computer upon specification of the computer as output section, wherein the determining step defines at least a first category which corresponds to a first threshold value, and a second category which corresponds to a second threshold value greater than the first threshold value, wherein, when the volume of image data is less than the first threshold, the specifying step specifies the printing section for printing the image data, wherein, when the volume of image data is greater than the first threshold but less than the second threshold, the specifying step specifies the display section for displaying the image data, and wherein, when the volume of image data is greater than the second threshold, the specifying step specifies the memory section for storing the image data.

* * * * *